Patented Oct. 17, 1922.

1,431,982

UNITED STATES PATENT OFFICE.

GEORGE A. RICHTER AND WALLACE B. VAN ARSDEL, OF BERLIN, NEW HAMPSHIRE, ASSIGNORS TO BROWN COMPANY, OF BERLIN, NEW HAMPSHIRE, A CORPORATION OF MAINE.

METHOD OF RESTORING THE ACTIVITY OF A CATALYST.

No Drawing. Application filed September 14, 1921. Serial No. 500,637.

*To all whom it may concern:*

Be it known that we, GEORGE A. RICHTER and WALLACE B. VAN ARSDEL, citizens of the United States, residing at Berlin, in the county of Coos and State of New Hampshire, have invented new and useful Improvements in Methods of Restoring the Activity of a Catalyst, of which the following is a specification.

This invention has relation to catalysts, such as are frequently employed in the hydrogenation of animal and vegetable oils, or the fatty acids.

It has been found that freshly reduced nickel is highly efficient in such hydrogenation processes, but such nickel catalysts lose in activity during use because of the action of poisons of more or less unknown nature, so that such catalysts in time become inert or of little value. Of these poisons, oxygen appears to be one, as a trace of that element suffices to form a film of nickel oxide on metallic surfaces and prevents action at the areas covered with the film.

The object of the present invention is to provide a means of revivifying or restoring a spent catalyst by removing the oxide film without the necessity of again reducing the nickel with hydrogen. We have found that it is possible, by the use of a dissolving agent (such for example as hydrochloric acid up to 1% in strength, ammonia up to 5%, or dilute lactic acid or formic acid), to remove the oxide therefrom.

In accordance with our process, the catalyst is first freed of oil by extraction with a solvent such as benzene or its equivalent. Then the catalyst is treated with the dissolving agent and washed with cold water, and is sealed against the access of air. The wet catalyst may be introduced into oil, or the water may be replaced with alcohol or acetone, or the water may be driven off by evaporation in an inert gas such as hydrogen, carbon dioxide or the like.

By following the procedure herein outlined, it is possible to restore the catalyst to its original activity without the necessity of passing it through a reducing furnace.

What we claim is:—

A process of revivifying or restoring the activity of a nickel catalyst which comprises extracting the oil from the catalyst by a solvent, then subjecting the catalyst to the action of an agent capable of dissolving the oxide film thereon, washing the catalyst to remove such agent, and sealing the same against the access of air.

In testimony whereof we have affixed our signatures.

GEORGE A. RICHTER.
WALLACE B. VAN ARSDEL.